United States Patent [19]
Zornig et al.

[11] 4,244,519
[45] Jan. 13, 1981

[54] SOLAR HEATED AND COOLED BUILDING

[76] Inventors: Harold F. Zornig, Rt. 2, Pendleton, S.C. 29670; Luther C. Godbey, Rt. #4, Seneca, S.C. 29678

[21] Appl. No.: 891,954

[22] Filed: Mar. 31, 1978

[51] Int. Cl.² .............................................. F24J 3/02
[52] U.S. Cl. .................................... 126/430; 126/428; 126/400
[58] Field of Search ................... 126/270, 271, 400; 237/1 A; 165/18; 236/103

[56] References Cited

U.S. PATENT DOCUMENTS

| | | | |
|---|---|---|---|
| 3,158,319 | 11/1964 | Nelson | 236/103 |
| 3,980,130 | 9/1976 | Thomason et al. | 165/18 |
| 3,997,108 | 12/1976 | Mason | 237/1 A |
| 4,051,999 | 10/1977 | Granger et al. | 237/1 A |
| 4,076,013 | 2/1978 | Bette | 237/1 A |
| 4,103,825 | 8/1978 | Zornig | 126/400 |
| 4,111,359 | 9/1978 | Trombe et al. | 237/1 A |
| 4,116,219 | 9/1978 | Nurnberg | 237/1 A |
| 4,127,973 | 12/1978 | Kachadorian | 237/1 A |

*Primary Examiner*—James C. Yeung
*Assistant Examiner*—Larry Jones

[57] ABSTRACT

Solar heated or cooled building in which attic functions as solar energy collector, ducts are provided to convey air between attic and thermal storage chamber, two blowers, each preceded by a power-operated damper, are provided in the duct work to provide several automated modes of operation.

10 Claims, 7 Drawing Figures

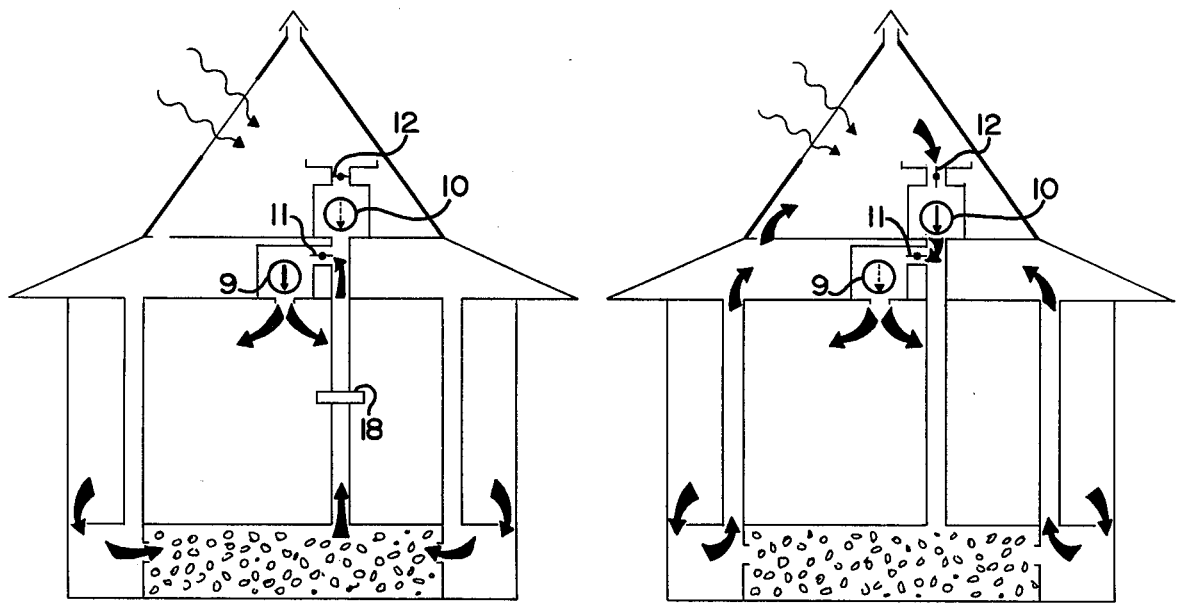
Fig.4
Fig.5
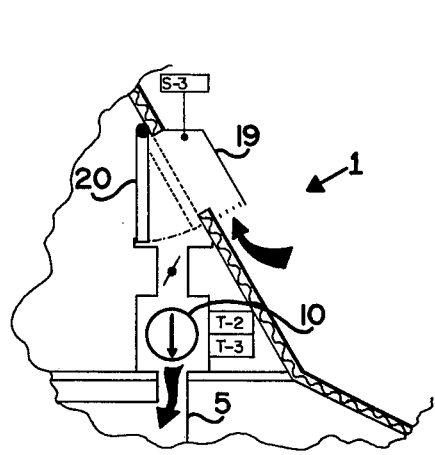
Fig. 6
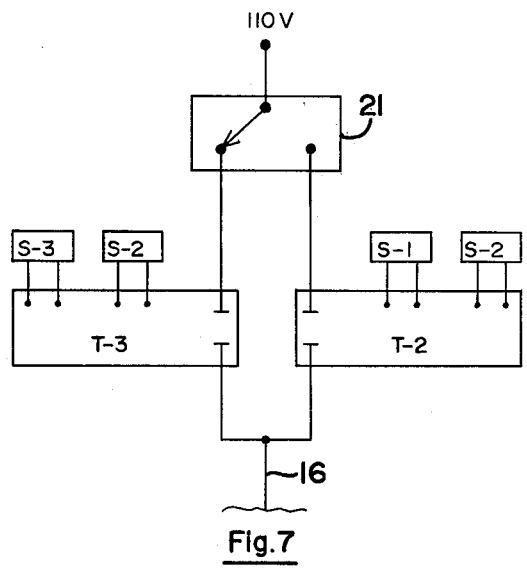
Fig.7

SOLAR HEATED AND COOLED BUILDING

CROSS-REFERENCE TO RELATED APPLICATION

This invention is related to Ser. No. 798,723, Filed May 19, 1977.

BACKGROUND OF THE INVENTION

1. Field of the Invention

This invention relates to solar heating and cooling of buildings. More particularly, it relates to direct heating or cooling of air in a building by solar energy means, storage of excess solar heat in a thermal storage chamber, and automated control of a plurality of modes of operation.

2. Description of Prior Art

Numerous solar energy systems for buildings have been developed in the prior art. However, most of these systems offer little economic value because of high initial cost, high maintenance cost, and a short life cycle.

The following patents and publications are cited to show previous inventions relating to the present invention: U.S. Pat. Nos. 831,411, 2,601,905, 2,680,565, 3,902,474, and 3,944,276; "Solar Energy Thermal Processes" by John A. Duffie and William A. Beckman, pp. 276–278, John Wiley & Sons.

SUMMARY OF THE INVENTION

A novel and practical solar energy system for buildings such as dwellings, rural houses and the like is provided and comprises:

(a) one or more rooms;

(b) a solar energy-collecting chamber adjacent the rooms;

(c) a thermal storage chamber adjacent the rooms;

(d) air passage means connected to the solar energy collecting chamber, the thermal storage chamber and the rooms to convey air therebetween; the air passage means including an air duct between the collecting and storage chambers;

(e) first blower means connected to the air duct and communicating with the rooms to withdraw air from the duct and blow it into the rooms;

(f) second blower connected to the air duct and communicating with the solar energy-collecting chamber to bring air into the duct from the collecting chamber;

(g) a first damper adjacent the first blower means to permit passage of air from the duct, through the first blower means and into the rooms;

(h) a second damper adjacent the second blower means to permit passage of air from the solar energy-collecting chamber, through the second blower means and into the duct;

(i) first automatic control means connected to the first damper and blower means to open the first damper and activate the first blower means; the first automatic control means including a first thermostat which detects the temperature in the rooms;

(j) second automatic control means connected to the second damper and blower means to open the second damper and activate the second blower means; the second automatic control means including a second thermostat which detects temperature differences between the solar energy-collecting chamber and the thermal storage chamber; and (k) switch means connected to the first and second automatic control means to prevent power from passing to the first blower means when the second blower means is activated.

It is therefore an object of the present invention to provide an affordable, low maintenance, long life solar energy system for a building.

Another object is to provide such a system which is especially suitable for rural housing.

A further object is to provide an automated system requiring a minimum number of dampers to accomplish a plurality of different air flow patterns through the building.

Yet another object is to provide an automated system requiring simple and comparatively inexpensive power circuitry.

BRIEF DESCRIPTION OF THE DRAWINGS

FIGS. 3–5 illustrate several modes of operation of FIG. 1;

FIG. 6 is a partial view of a modification of FIG. 1; and

FIG. 7 is a partial view of the circuit diagram of the control system of FIG. 6.

DETAILED DESCRIPTION

Figure 1:
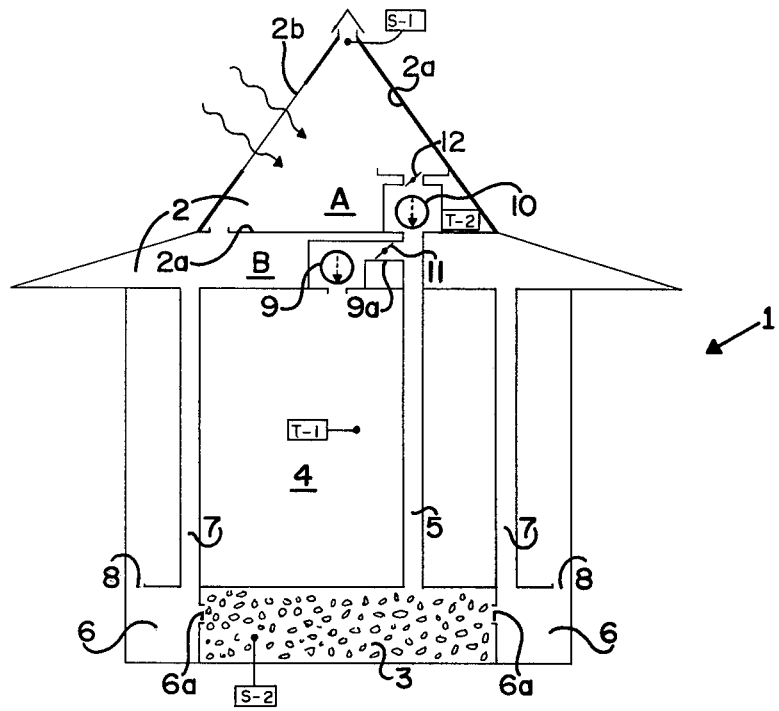
FIG. 1 illustrates an embodiment of the present invention.

Referring to FIG. 1, in the preferred embodiment of the present invention, building 1 includes a solar heated attic 2 as the solar energy-collecting chamber, and a rock bed 3, disposed below room or rooms 4, as the thermal storage chamber. Although not essential to the invention, attic 2 may include upper and lower plenums A and B, for the reasons disclosed in copending application Ser. No. 798,723. The attic also may include heat absorption components such as black sheet material 2a and a translucent or equivalent room panel 2b to readily transmit solar energy into the interior of the attic.

The air passage means for conveying air between the attic, the room and the rock bed comprises an air duct 5, plenums 6 and air conduits 7. Air duct 5 is connected to the attic 2 and rock bed 3 to convey air therebetween. Plenums 6 are connected to the rock bed and rooms by means of openings 6a and floor registers or apertures 8, respectively. Depending upon the mode of operation, the plenums receive air from the rock bed or rooms, and, in some instances, convey air from the rooms to the rock bed. Conduits 7, which are connected between attic 2 and plenums 6, cooperate with the plenums to convey air from the rock bed to the attic, or from the rooms to the attic.

A first blower or fan 9 connected by arm 9a to the side of vertical duct 5 withdraws air from the duct 5 and blows it into the rooms 4 of the building. A second blower 10 at the top of duct 5 brings attic air into duct 5. Blowers 9 and 10 are immediately preceded by power operated dampers 11 and 12, respectively. When the damper motors (not shown) are activated by a power source, the dampers open up and allow air to pass through the respective blower. When deactivated, dampers 11 and 12 remain closed by means of, for example, return springs, and prevent passage of air through respective blowers.

A thermostat T-1 located in one of the rooms of the building includes a temperature sensor which generates a signal whenever the temperature reaches a preselected or predetermined value. A second thermostat T-2, which may be located at any convenient place such as in the attic adjacent blower 10, receives temperature-indicating signals from temperature sensors S-1 and S-2, located in the attic and rock bed, respectively.

Figure 2:
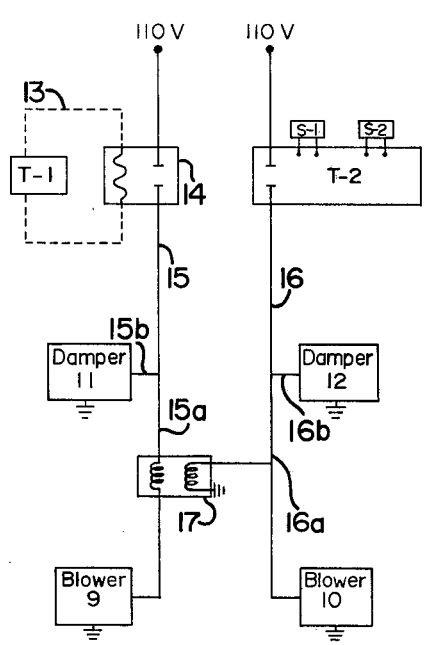
FIG. 2 is a circuit diagram of the control system of FIG. 1.

The functions of thermostats T-1 and T-2 are illustrated in FIG. 2. Referring thereto, thermostat T-1 is part of a first automatic control circuit which includes circuit 13 (24 volts), switch 14 and power circuit 15. Whenever the room temperature falls to a predetermined magnitude, thermostat T-1 activates circuit 13 which in turn closes switch 14 and thereby activates power circuit 15. Parallel circuits 15a and 15b in power circuit 15 simultaneously supply power to blower 9 and damper 11, respectively.

Thermostat T-2, which is part of a second automatic control power circuit 16, activates such circuit whenever the temperature difference between the attic (S-1) and rock bed (S-2) reaches a predetermined value, for example, when the attic is at least 15° hotter than the rock bed. Upon activation of circuit 16, power is simultaneously supplied to blower 10 and damper 12 through parallel circuits 16a and 16b, respectively. Whenever blower 10 is activated, a relay switch 17 connected to circuits 15a and 16a prevents power from flowing to first blower 9.

Figure 3:
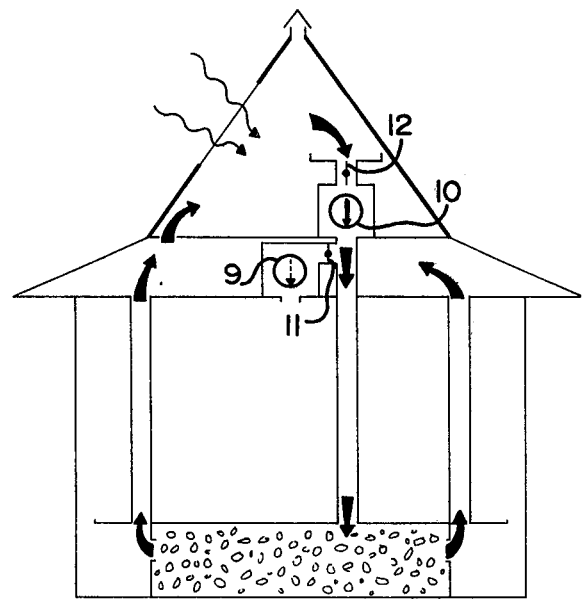

In the operation mode depicted in FIG. 3, the rooms of the building are warm enough so that first power circuit 15 is in a deactivated state, i.e., blower 9 is off, damper 11 is closed. However, conditions are such that the attic temperature is 15° hotter than the rock bed so that the switch in differential thermostat T-2 is closed and power circuit 16 is activated. Thus, damper 12 is open, blower 10 is on. These conditions provide the flow pattern of FIG. 3, which results in the rock bed being heated by hot air from the attic.

Later in the day, perhaps at night, thermostat T-1 may call for heat. For example, the room temperature may have fallen to 68° F., thereby turning on blower 9 and opening damper 11. The attic no longer may be sufficiently hotter than the rock bed, whereby circuit 16 will be in a deactive state. Under these conditions, heat from the rock bed will be drawn into the rooms of the house by means of blower 9, to provide the flow pattern of FIG. 4. An additional thermostat (not shown) may be provided in the house to activate a supplemental heater 18 in duct 5, whenever the room temperature continues to fall to, for example, 65° F.

Yet another operation mode is provided when the attic is hot enough to activate circuit 16 at the same time that room thermostat T-1 calls for activation of circuit 15. Under these circumstances, relay switch 17 connected to both circuits 15a and 16a cuts off power through circuit 15a thereby deactivating blower 9. The overall result is that blower 10 is on, while both dampers 11 and 12 are open, to provide the flow pattern of FIG. 5, wherein hot attic air is blown directly into the rooms of the house.

The system of the present invention may be modified in the manner of FIG. 6 for summer cooling of the building. Referring thereto, an outside vent 19 is provided in the roof of building 1 adjacent blower 10. A manually operated damper 20 adjacent vent 19 permits cool outside air to be drawn into duct 5 by blower 10 in place of hot attic air. A temperature sensor S-3 is located in vent 19 to generate a signal indicating the outside air temperature. Also included is a third thermostat T-3, to receive signals from sensors S-3 (outside air) and S-2 (rock bed).

The power circuitry for FIG. 6 is basically the same as FIG. 2, except that thermostat T-1 may be set for summer or winter operation. For example, it may be set to activate circuit 15 whenever the room temperature rises to a predetermined value, e.g., 75° F. Additionally, as shown in FIG. 7, a slide switch 21 is provided in the power circuitry to selectively connect either second thermostat T-2 or third thermostat T-3 to power circuit 16. As illustrated, the system is set for summer operation, i.e., thermostat T-3 is engaged with power circuit 16. Thermostat T-3, which receives signals from S-3 (outside air) and S-2 (rock bed), is set to activate circuit 16 whenever the temperature difference between the outside air and rock bed reaches a predetermined value, for example, when the outside air is at least 7° cooler than the rock bed.

As a result, the flow patterns of FIGS. 3-5 also may be provided in the summer, except that cool outside air replaces solar heated attic air in the system. Additionally, in the same manner that an extra room thermostat may be set to activate supplemental heat 18 in the winter, it may also be connected to cooling means (e.g., an electric air conditioner) during the summer so as to activate supplemental cooling whenever the room temperature continues to rise to, for example 78° F.

As a further modification (not shown), blower 10 may be a multi- to two-speed blower, and the circuitry may incorporate a double throw switch in place of slide switch 21, in order to activate the blower at high speed during summer operation. Additionally, blower 10 may include a temperature sensor which activates high speed at 100° F. In another modification, outside air may be drawn into the system in the summer in the manner disclosed in copending Ser. No. 798,723.

Having thus described our invention, what we claim is:

1. A solar heated building comprising:
   (a) at least one room;
   (b) a solar energy-collecting chamber adjacent said room;
   (c) a thermal storage chamber adjacent said room;
   (d) air passage means connected to said solar energy-collecting chamber, thermal storage chamber and room to convey air therebetween; said air passage means including an air duct between said collecting and storage chambers;
   (e) additional air passage means connected to the solar energy collecting chamber, thermal storage chamber and the room to convey air therebetween;
   (f) first blower means connected to said duct and communicating with said room to withdraw air from said duct and blow it into said room;
   (g) second blower means connected to said duct and communicating with said solar energy-collecting chamber to bring air into said duct from said collecting chamber;
   (h) a first damper adjacent said first blower means to permit passage of air from said duct, through said first blower means and into said room;
   (i) a second damper adjacent said second blower means to permit passage of air from said solar energy-collecting chamber, through said second blower means and into said duct;

(j) first automatic control means connected to said first damper and blower means to open said first damper and activate said first blower means; said first automatic control means including a first thermostat which detects the temperature in said room;

(k) second automatic control means connected to said second damper and blower means to open said second damper and activate said second blower means; said second automatic control means including a second thermostat which detects temperature differences between said solar energy-collecting chamber and said thermal storage chamber; and (l) switch means connected to said first and second automatic control means to prevent power from flowing to said first blower means when said second blower means is activated.

2. The building of claim 1 wherein said additional air passage means includes a plenum connected to said room and said thermal storage chamber, and a conduit between said plenum and said solar energy-collecting chamber.

3. The building of claim 1 further including a third thermostat to detect temperature differences between said thermal storage chamber and air outside said building; means to selectively connect either said second or third thermostats to said second automatic control means.

4. The building of claim 1 wherein said solar energy-collecting chamber comprises an attic above said room; and wherein said thermal storage chamber comprises a rock bed below said room.

5. The building of claim 2 further including a third thermostat to detect temperature differences between said thermal storage chamber and air outside said building, and means to selectively connect either said second or third thermostats to said second automatic control means.

6. The building of claim 2 wherein said solar energy-collecting chamber comprises an attic above said room; and wherein said thermal storage chamber comprises a rock bed below said room.

7. The building of claim 3 wherein said solar energy-collecting chamber comprises an attic above said room; and wherein said thermal storage chamber comprises a rock bed below said room.

8. The building of claim 5 wherein said solar energy-collecting chamber comprises an attic above said room; and wherein said thermal storage chamber comprises a rock bed below said room.

9. The building of claim 7 further including outside vent means adjacent said second blower means to permit outside air to be drawn into said air duct in place of air in said attic.

10. The building of claim 8 further including outside vent means adjacent said second blower means to permit outside air to be drawn into said air duct in place of air in said attic.

* * * * *

UNITED STATES PATENT AND TRADEMARK OFFICE
CERTIFICATE OF CORRECTION

PATENT NO. : 4,244,519

DATED : January 13, 1981

INVENTOR(S) : Harold F. Zornig and Luther C. Godbey

It is certified that error appears in the above—identified patent and that said Letters Patent is hereby corrected as shown below:

[73]  Assignee: The United States of America as represented by the Secretary of Agriculture, Washington, D. C.

Signed and Sealed this

Eighteenth Day of August 1981

[SEAL]

*Attest:*

GERALD J. MOSSINGHOFF

*Attesting Officer*  *Commissioner of Patents and Trademarks*